United States Patent
Das et al.

(10) Patent No.: US 9,125,134 B2
(45) Date of Patent: Sep. 1, 2015

(54) PROXIMITY AGENT BASED OUT OF BAND COMMUNICATION FOR FEMTOCELL OPERATION

(75) Inventors: Soumya Das, San Diego, CA (US);
Nishith Chaubey, San Diego, CA (US);
Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 12/861,616

(22) Filed: Aug. 23, 2010

(65) Prior Publication Data
US 2012/0046025 A1 Feb. 23, 2012

(51) Int. Cl.
*H04W 4/00* (2009.01)
*H04W 48/08* (2009.01)
(Continued)

(52) U.S. Cl.
CPC ............ *H04W 48/08* (2013.01); *H04W 52/243* (2013.01); *H04W 52/242* (2013.01); *H04W 52/244* (2013.01); *H04W 52/245* (2013.01);
(Continued)

(58) Field of Classification Search
CPC ..... H04W 88/06; H04W 28/18; H04W 84/12; H04W 88/08; H04W 8/245; H04W 88/085; H04W 48/16; H04W 36/18; H04W 84/042; H04W 36/26; H04W 16/20; H04W 92/12; H04W 48/18; H04W 52/40; H04W 8/183; H04W 8/205; H04W 52/343; H04W 52/48; H04W 36/00; H04W 88/02; H04B 2201/70703; H04B 1/7101; H04B 2201/70702; H04B 1/7103; H04B 7/18563; H04L 1/0025; H04L 12/4633; H04L 2209/80; H04N 21/43637; H04M 1/725; H04M 1/00; H04M 2250/02

USPC ............ 455/422.1, 434, 444; 340/10.1, 10.2, 340/10.34
See application file for complete search history.

(56) References Cited

U.S. PATENT DOCUMENTS 8,712,461 B2 4/2014 Yavuz et al.
2004/0229621 A1* 11/2004 Misra ........................... 455/445
(Continued)

FOREIGN PATENT DOCUMENTS

| | | |
|---|---|---|
| CN | 101778463 A | 7/2010 |
| JP | 2007518361 A | 7/2007 |

(Continued)

OTHER PUBLICATIONS

Knisely et al., "Standardization of Femtocells in 3GPP" Femtocell Wireless Communications, IEEE Communications Magazine, Sep. 2009, pp. 68-75.

(Continued)

*Primary Examiner* — Nimesh Patel
(74) *Attorney, Agent, or Firm* — Jeffrey D. Jacobs

(57) ABSTRACT

Out of band (OOB) communication facilitates femtocell operation. One or more proximity agent provides out of band communication with nodes (e.g., mobile client devices) to provide assistance in or otherwise facilitate femtocell discovery, reselection, and/or interference mitigation. Out of band communication techniques provide for low power discovery, association, and communication as compared to corresponding femtocell or cellular network communication techniques. An OOB proximity agent is provided in association with a femtocell to provide transmit power level control with respect to the femtocell. In operation, if a client device searches for and finds an OOB proximity agent, it will find a femtocell, thereby avoiding a need to aggressively search for femtocells.

28 Claims, 10 Drawing Sheets

(51) Int. Cl.
*H04W 52/24* (2009.01)
*H04W 52/28* (2009.01)
*H04W 84/04* (2009.01)
*H04W 84/18* (2009.01)

(52) U.S. Cl.
CPC ........... *H04W 52/283* (2013.01); *H04W 84/045* (2013.01); *H04W 84/18* (2013.01)

(56) References Cited

U.S. PATENT DOCUMENTS

| | | | |
|---|---|---|---|
| 2007/0079113 A1 | 4/2007 | Kulkarni et al. | |
| 2008/0137594 A1* | 6/2008 | Roh et al. | 370/328 |
| 2009/0098873 A1 | 4/2009 | Gogic | |
| 2009/0156213 A1 | 6/2009 | Spinelli et al. | |
| 2009/0163216 A1 | 6/2009 | Hoang et al. | |
| 2009/0219844 A1 | 9/2009 | Soliman | |
| 2009/0221261 A1 | 9/2009 | Soliman | |
| 2009/0227282 A1 | 9/2009 | Miyabayashi et al. | |
| 2009/0248913 A1 | 10/2009 | Salokannel | |
| 2009/0280853 A1* | 11/2009 | Brisebois et al. | 455/522 |
| 2009/0288145 A1 | 11/2009 | Huber et al. | |
| 2010/0085884 A1* | 4/2010 | Srinivasan et al. | 370/252 |
| 2010/0278141 A1* | 11/2010 | Choi-Grogan et al. | 370/331 |
| 2011/0130143 A1 | 6/2011 | Mori et al. | |
| 2012/0094663 A1* | 4/2012 | Awoniyi et al. | 455/434 |

FOREIGN PATENT DOCUMENTS

| | | |
|---|---|---|
| JP | 2008295045 A | 12/2008 |
| WO | 2005069519 | 7/2005 |
| WO | 2009023604 | 2/2009 |
| WO | WO-2009022534 A1 | 2/2009 |
| WO | WO-2009049197 A2 | 4/2009 |
| WO | WO-2009111179 A1 | 9/2009 |

OTHER PUBLICATIONS

Knisely et al., "Standardization of Femtocells in 3GPP2" Femtocell Wireless Communications, IEEE Communications Magazine, Sep. 2009, pp. 76-82.

International Search Report and Written Opinion—PCT/US2011/048801—ISA/EPO—Nov. 22, 2011.

Tiedemann E G: "Femtocell Activities in 3GPP2 TSG-C", 3rd Generation Partnership Project (3GPP); Technicalspecification Group (TSG) Radio Access Network (RAN); Working Group 2 (WG2), XX, XX Mar. 31, 2009, pp. 1-18, XP002599307, Retrieved from the Internet: URL:fftp://ftp.3gpp2.org/TSGX/Working/2009/2009-03-New%200rleans/A11%20TS G%20Femto%20Discussion/XS1-20090331-004-TSG-C Femto%200 Overview-090330.p [retrieved on Sep. 2, 2010].

\* cited by examiner

PROXIMITY AGENT BASED OUT OF BAND COMMUNICATION FOR FEMTOCELL OPERATION

TECHNICAL FIELD

The disclosure relates generally to network communication and, more particularly, to using proximity agent based out of band communication for femtocell operation, such as to provide interference mitigation and aid femtocell selection.

BACKGROUND

Information communication provided by various forms of networks is in wide use in the world today. Networks having multiple nodes in communication using wireless and wireline links are used, for example, to carry voice and/or data. The nodes of such networks may be computers, personal digital assistants (PDAs), phones, servers, routers, switches, multiplexers, modems, radios, access points, base stations, etc. Many client device nodes (also referred to as user equipment (UE) or mobile station (MS)), such as cellular phones, PDAs, laptop computers, etc. are mobile and thus may connect with a network through a number of different interfaces. For example, mobile client devices may connect with a network wirelessly via a nearest base station, access point, wireless router, etc. (collectively referred to herein as access points). A mobile client device may remain within the service area of such an access point for a relatively long period of time (referred to as "camped on" the access point) or may travel relatively rapidly through access point service areas, such as by using cellular handoff or reselection techniques for maintaining a communication session or for idle mode operation as association with access points is changed.

Limitations with respect to available spectrum, bandwidth, capacity, etc. may result in a network interface being unavailable or inadequate between a particular client device and access point. Moreover, limitations with respect to wireless signal propagation, such as shadowing, multipath fading, interference, etc., may result in a network interface being unavailable or inadequate between a particular client device and access point.

Cellular networks have employed the use of various cell types, such as macrocells, microcells, picocells, and femtocells, to provide desired bandwidth, capacity, and wireless communication coverage within service areas. For example, the use of femtocells is often desirable to provide wireless communication in areas of poor network coverage (e.g., inside of buildings), to provide increased network capacity, to utilize broadband network capacity for backhaul, etc. Femtocell transmit power is typically a tradeoff between interference (i.e., femtocell signal transmit levels causing interference for other nodes of the network) and reliable detection (i.e., femtocell transmit levels being sufficient for reliable detection by nodes wishing to communicate with the femtocell). If the femtocell transmit power is high, mobile client devices can more readily detect and associate with an available femtocell. However, such femtocell transmissions are more likely to interfere with other nodes not wishing to communicate with the femtocell, such as nodes in communication with an overlying macrocell. If the femtocell transmit power is low, interference with such other nodes can be mitigated, but mobile client devices are not readily able to detect and associate with the femtocell.

Mobile client devices generally operate using an internal power supply, such as a small battery, to facilitate their highly mobile operation. Typical operation to provide femtocell system selection, however, has an appreciable impact upon the power utilized by a mobile client device. Searching for available femtocells within range, negotiating links, etc. in typical use scenarios will often result in a reduction of the mobile client device standby time operation available from the internal power supply by approximately 10%. For example, an internal power supply may be appreciably drained as a result of a mobile client device continuing to search for femtocells whether or not appropriate femtocells are in range of the mobile client device.

BRIEF SUMMARY

The present disclosure is directed to systems and methods which utilize out of band (OOB) communication to facilitate femtocell operation. Embodiments implement one or more proximity agent providing out of band communication with nodes (e.g., mobile client devices) to provide assistance in or otherwise facilitate reselection, interference mitigation, and/or femtocell discovery. Out of band communication techniques utilized according to embodiments herein provide for low power discovery, association, and communication as compared to corresponding femtocell or cellular network communication techniques.

An OOB proximity agent of embodiments is provided in association with a femtocell, whether integral to or separate from the associated femtocell. The femtocell provides communication links for use by client devices in accordance with a cellular network for providing desired network communication sessions, while the OOB proximity agent provides communication links for use by the client devices which are out of band with respect to the cellular network for providing assistance in femtocell discovery, reselection and/or interference mitigation. In operation according to embodiments, if a client device searches for and finds an OOB proximity agent, it will thus find a femtocell, thereby avoiding a need to aggressively search for femtocells.

A trigger condition may, for example, cause a client device to activate an out of band radio (e.g., BLUETOOTH radio) to send an OOB proximity agent inquiry or paging message (e.g., a previously attached proximity agent, a new proximity agent, etc.). Trigger conditions may include various measurements, determinations, etc., such as a macro pilot Ec/Io average threshold (e.g., −16 dB, −13 dB), the client device being located in a preferred user zone (e.g., by analyzing location signatures), the client device location is not changing for a period of time, etc.

Embodiments may implement techniques in addition to or in the alternative to a trigger condition for causing a client device to activate an out of band radio and send an OOB proximity agent inquiry or paging message. For example, an OOB proximity agent may proactively operate to page client devices (e.g., transmitting a paging signal or a beacon periodically). Thus, when a client device is within range of such an OOB proximity agent the client device may send a paging response whereby the client device and a femtocell detect each other over the OOB link.

Once an OOB proximity agent is discovered, the OOB proximity agent can provide assistance to the client device with respect to femtocell selection and association. For example, the OOB proximity agent may identify a femtocell to which the client device is to associate, may "wake up" the femtocell for client device access, may cause the femtocell to increase transmit power for client device association, etc. Thereafter, the client device may interface with the femtocell for desired network communications.

In operation according to embodiments, if an OOB proximity agent is not discovered, the client device may fall back on regular femtocell discovery and selection techniques, if desired. Accordingly, embodiments aid rather than replace femtocell selection techniques.

Client devices (e.g., frequent users and occasional users of a femtocell) of embodiments may have profiles which are registered with one or more OOB proximity agent. In operation according to an embodiment, if all registered client devices are attached to an OOB proximity agent, the OOB proximity agent may notify an associated femtocell which can modify its operation accordingly. For example, having all client devices served by the femtocell already attached, the femtocell may lower its transmit power to that needed to adequately serve the attached client devices, stop transmitting beacons in macrocell frequencies, and/or the like. Additionally or alternatively, an OOB proximity agent may provide information to facilitate a femtocell disabling its radio transmitter or to reduce the power level when there are no client devices detected by the OOB proximity agent (e.g., no client devices discovered by the OOB proximity agent irrespective of whether they are in proximity agent mode or not). Accordingly, as client devices discover the OOB proximity agent when in femto-proximity agent coverage range, the OOB proximity agent may provide information to the femtocell so that the femtocell radio transmitter is enabled or the power level is increased to facilitate communication between the client device and femtocell. Likewise, an OOB proximity agent of embodiments can aid in femtocell transmit power self calibration.

As can be appreciated from the foregoing, operation according to embodiments reduces interference with other network nodes, provides reduced power level femtocell discovery and association, and/or facilitates femtocell discovery. Moreover, in providing operation according to embodiments herein no client device provisioning and no radio access network (RAN) configuration is needed.

The foregoing has outlined rather broadly the features and technical advantages of embodiments of the present disclosure in order that the detailed description that follows may be better understood. Additional features and advantages will be described hereinafter. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the spirit and scope of the appended claims. The novel features which are believed to be characteristic of the concepts disclosed herein, both as to their organization and method of operation, together with further objects and advantages will be better understood from the following description when considered in connection with the accompanying figures. It is to be expressly understood, however, that each of the figures is provided for the purpose of illustration and description only and is not intended as a definition of the limits of the claims.

BRIEF DESCRIPTION OF THE DRAWING

For a more complete understanding of the present teachings, reference is now made to the following description taken in conjunction with the accompanying drawings.

DETAILED DESCRIPTION

Figure 1A:
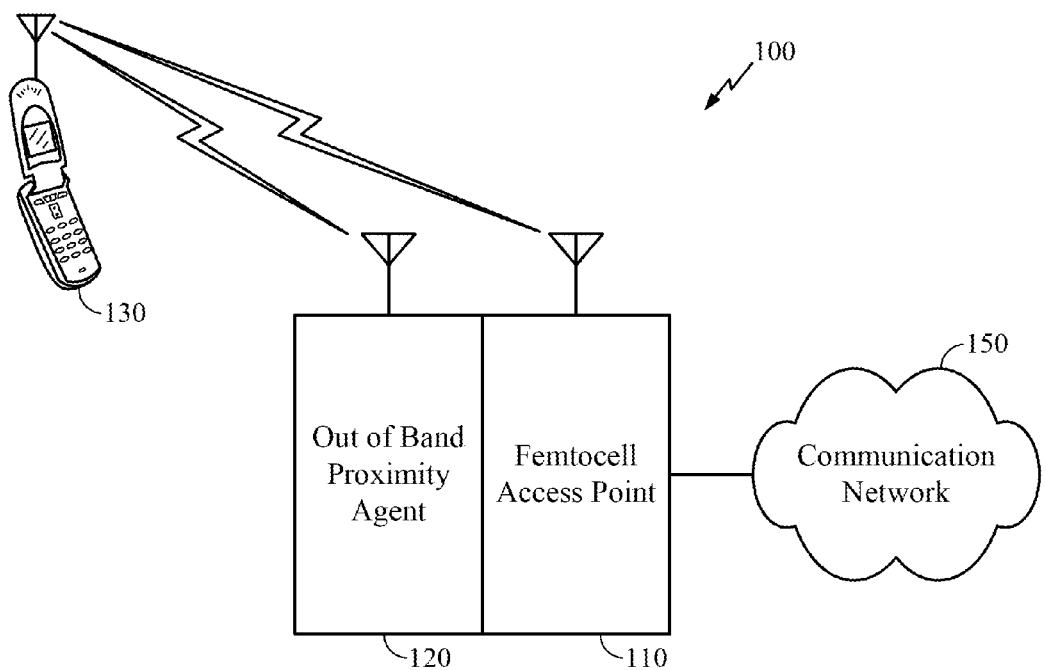
FIG. 1A shows a block diagram of a wireless communication system adapted according to embodiments disclosed herein.
Figure 4A:
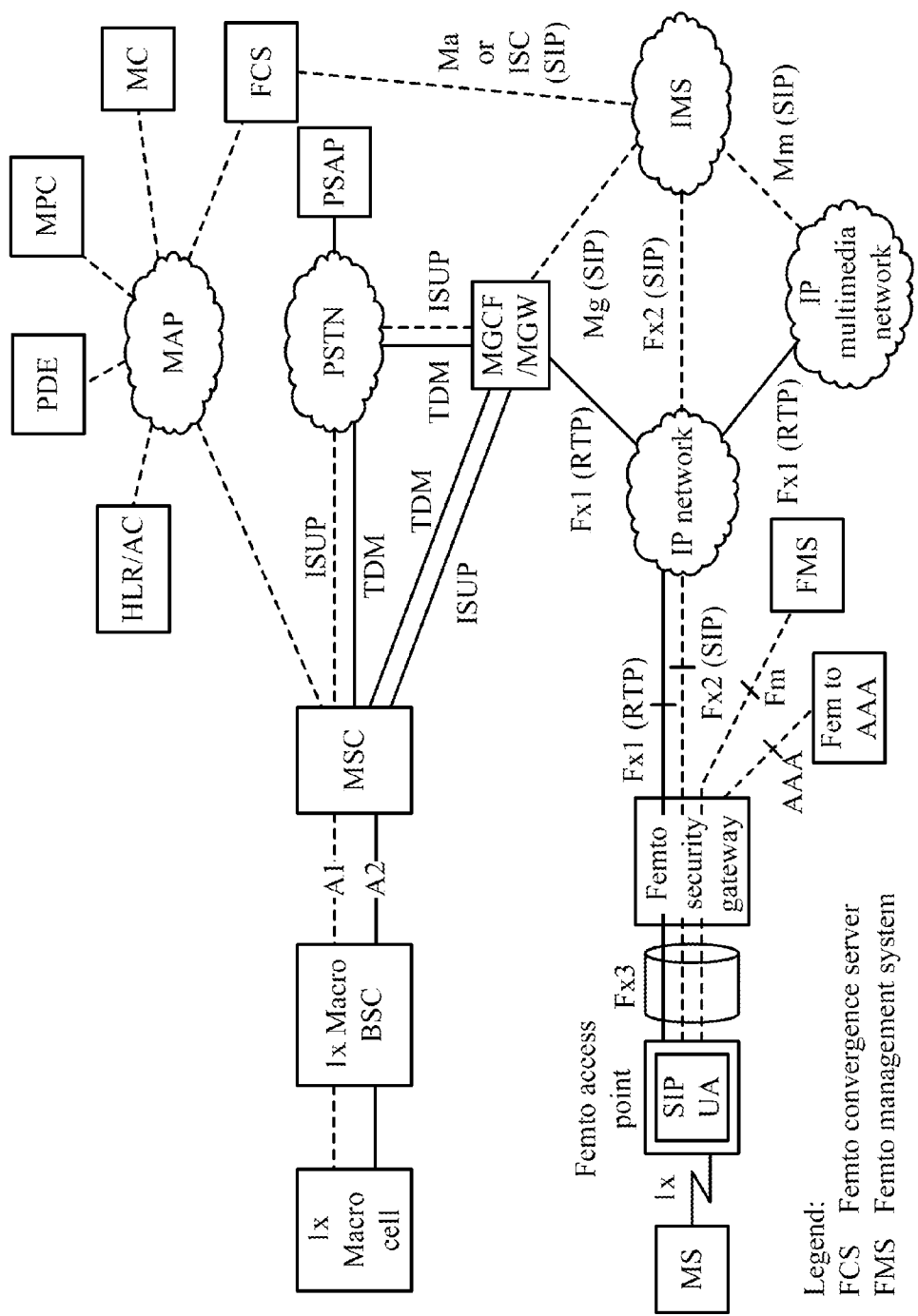
FIGS. 4A and 4B show femtocell architecture for various services
Figure 4B:
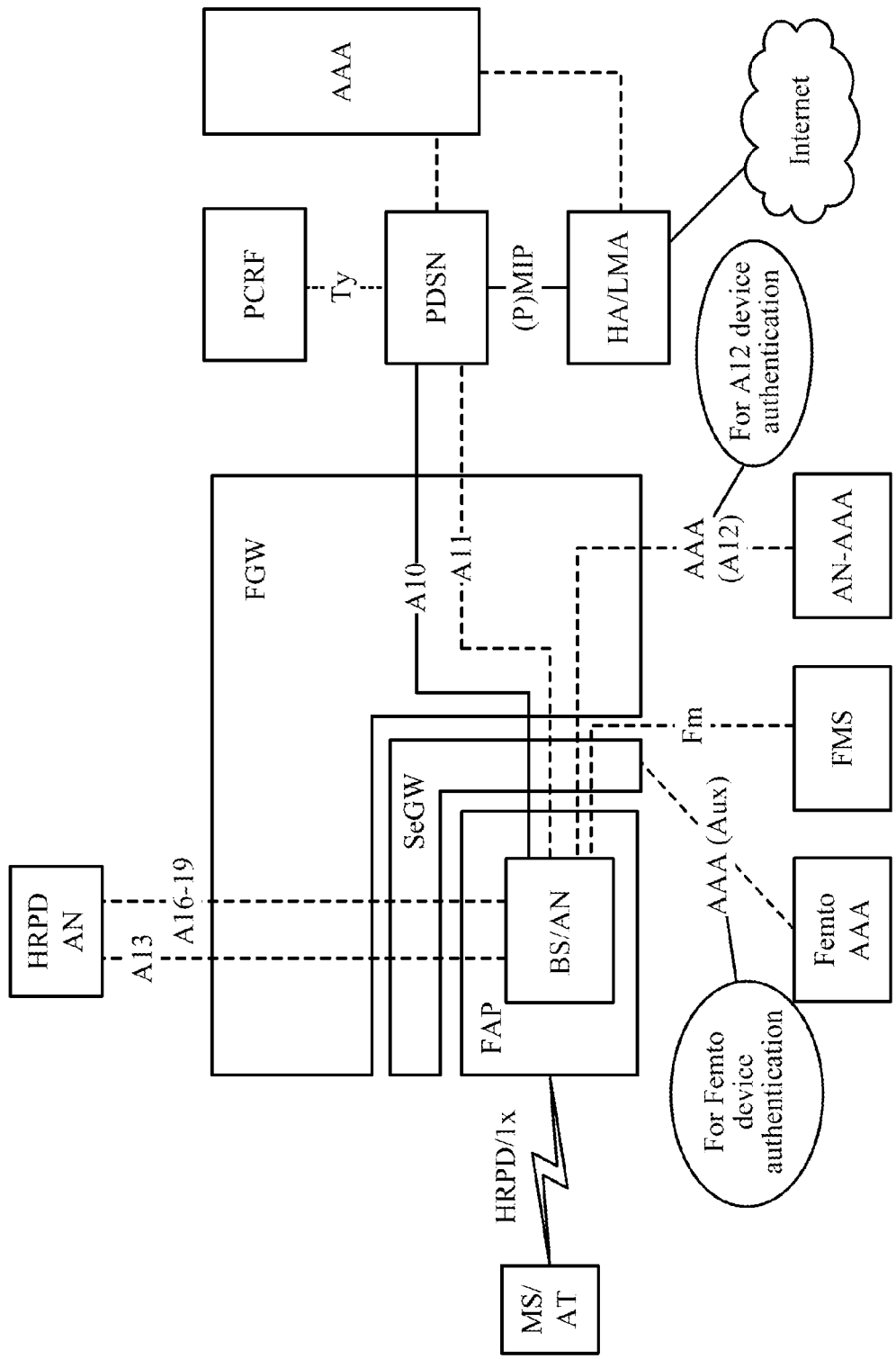

A block diagram illustrating wireless communication system 100 in which one or more out of band (OOB) proxies operate to provide interference mitigation and/or aid femtocell selection according to embodiments herein is shown in FIG. 1A. As shown in FIG. 1A, femtocell access point 110 may provide a wireless interface for communication network 150, such as a cellular telephone network, a cellular data network, a local area network (LAN), a metropolitan area network (MAN), a wide area network (WAN), the public switched telephone network (PSTN), the internet, etc. FIGS. 4A and 4B show further detail with respect to femtocell architecture in communication networks for providing various services. Specifically, FIG. 4A shows detail regarding a femtocell architecture for legacy circuit services and FIG. 4B shows detail regarding femtocell architecture for packet data service access using legacy interfaces. As shown in FIG. 1A, various devices (e.g., client device 130) are adapted for communicating over wireless communication network 150, such as via one or more access points (e.g., femtocell access point 110).

Femtocell access point 110 of the illustrated embodiment may have various configurations of base station or wireless access point equipment. As used herein, a femtocell access point may be a device that communicates with various terminals (e.g., client devices, proximity agent devices, etc.) and may also be referred to as, and include some or all the functionality of, a base station, a Node B, and/or other similar devices. Although referred to herein as a femtocell access point, it should be appreciated that the concepts herein are applicable to access point configurations other than femtocell configuration (e.g., picocells, microcells, etc.). Embodiments of femtocell access point 110 utilize communication frequencies and protocols native to a corresponding cellular network (e.g., communication network 150, or a portion thereof) to facilitate communication within a service area associated with femtocell access point 110 (e.g., to provide improved coverage of an area, to provide increased capacity, to provide increased bandwidth, etc.).

Figure 1B:
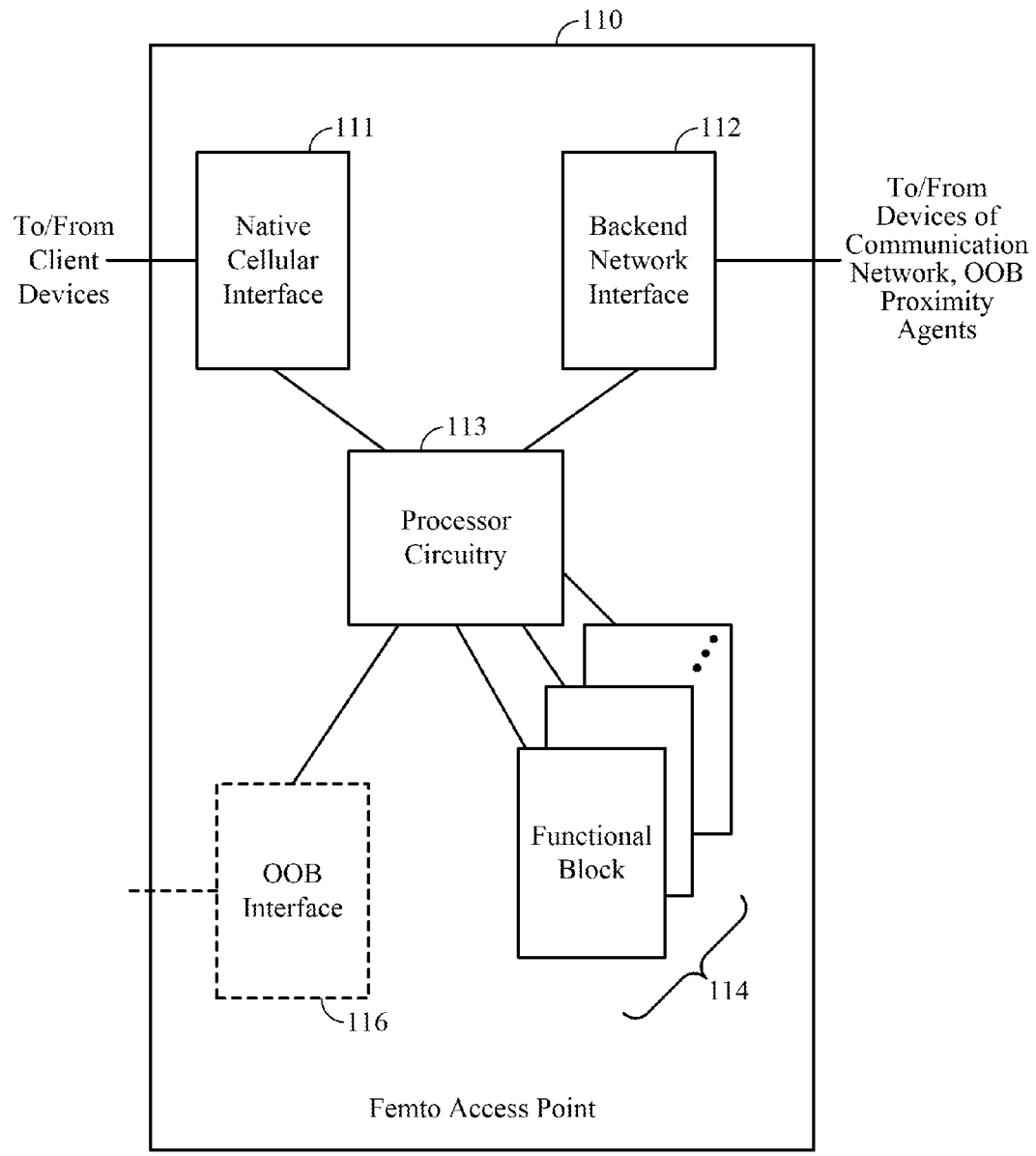
FIG. 1B shows detail with respect to a femtocell access point of the wireless communication system of FIG. 1A according to embodiments disclosed herein.

Referring now to FIG. 1B, additional detail with respect to an embodiment of femtocell access point 110 is shown. Femtocell access point 110 may have various configurations of devices, such as a processor-based system configured as a cellular base station, etc. providing wireless links with respect to communication network 150 of FIG. 1A. Accordingly, femtocell access point 110 of the illustrated embodiment includes native cellular interface 111 (e.g., a transceiver utilizing cellular network communication techniques that may consume relatively large amounts of power in operation) for communicating with various appropriately configured devices, such as client device 130 of FIG. 1A, through a native cellular wireless link (e.g., "in band" communication link). Such a communication interface may operate according to various communication standards, including but not limited to wideband code division multiple access (W-CDMA), CDMA2000, global system for mobile telecommunication (GSM), worldwide interoperability for microwave access (WiMax), and wireless LAN (WLAN). Furthermore, femtocell access point 110 of the illustrated embodiment also includes backend network interface 112 (e.g., a backhaul interface providing communication via the Internet, a packet switched network, a switched network, a radio network, a control network, a wired link, and/or the like) for communicating with various devices.

OOB interface 116 (e.g., a transceiver that may consume relatively low amounts of power in operation and/or may cause less interference in the in the in band spectrum) is shown as an optional interface in the illustrated embodiment of femtocell access point 110. Such a OOB interface may be utilized according to embodiments to provide low power wireless communications with respect to various appropriately configured devices, such as OOB proximity agent 120 of FIG. 1A, client device 130 of FIG. 1A, etc. OOB interface 116 may, for example, provide a BLUETOOTH link, an ultra-wideband (UWB) link, an IEEE 802.11 (WLAN) link, etc.

It should be clear that the terms "high power" and "low power" as used herein are relative terms and do not imply a particular level of power consumption. Accordingly, OOB interface 116 may simply consume less power than native cellular interface 111 for a given time of operation. In one implementation, such an OOB interface provides relatively low bandwidth communication, relatively short range communication, and/or consumes relatively little power whereas the native cellular interface provides relatively high bandwidth communication, longer range communication, and/or consumes appreciably more power. It should be appreciated, however, that there is no limitation to an OOB interface of particular embodiments be low power, short range, or low bandwidth. Accordingly, an OOB link used according to embodiments herein may or may not be low power as compared to femtocell operation or other network links. Embodiments may use any suitable out-of-band link, whether wireless or otherwise, such as IEEE 802.11, BLUETOOTH, PEANUT, UWB, ZIGBEE, an IP tunnel, a wired link, etc. Moreover, embodiments may utilize virtual OOB links, such as through use of IP based mechanisms over a wireless wide area network (WWAN) link (e.g., IP tunnel over a WWAN link) that act as a virtual OOB link.

Femtocell access point 110 of the embodiment illustrated in FIG. 1B further includes one or more functional blocks 114, including circuitry and/or instruction sets, operable to provide desired functionality with respect to femtocell access point 110 (e.g., call processing, database management, message routing, etc.). Native cellular interface 111, backend network interface 112, functional blocks 114, and OOB interface 116 operate under control of processor circuitry 113, such as a general purpose processor operable under control of an instruction set (e.g., software, firmware, etc.) or special purpose processor (e.g., ASIC, PGA, etc.), providing operation as described herein. Processor circuitry 113 can include circuitry in addition to the aforementioned processor, such as memory (e.g., random access memory (RAM), read only memory (ROM), flash memory, magnetic memory, optical memory, etc.), input/output circuits (e.g., display, keyboard, pointer, audio, etc.), and/or the like. Although illustrated as part of femtocell access point 110 in FIG. 1B, it should be appreciated that various functional blocks thereof may be provided by other devices of communication network 150 of FIG. 1A.

Figure 1C:
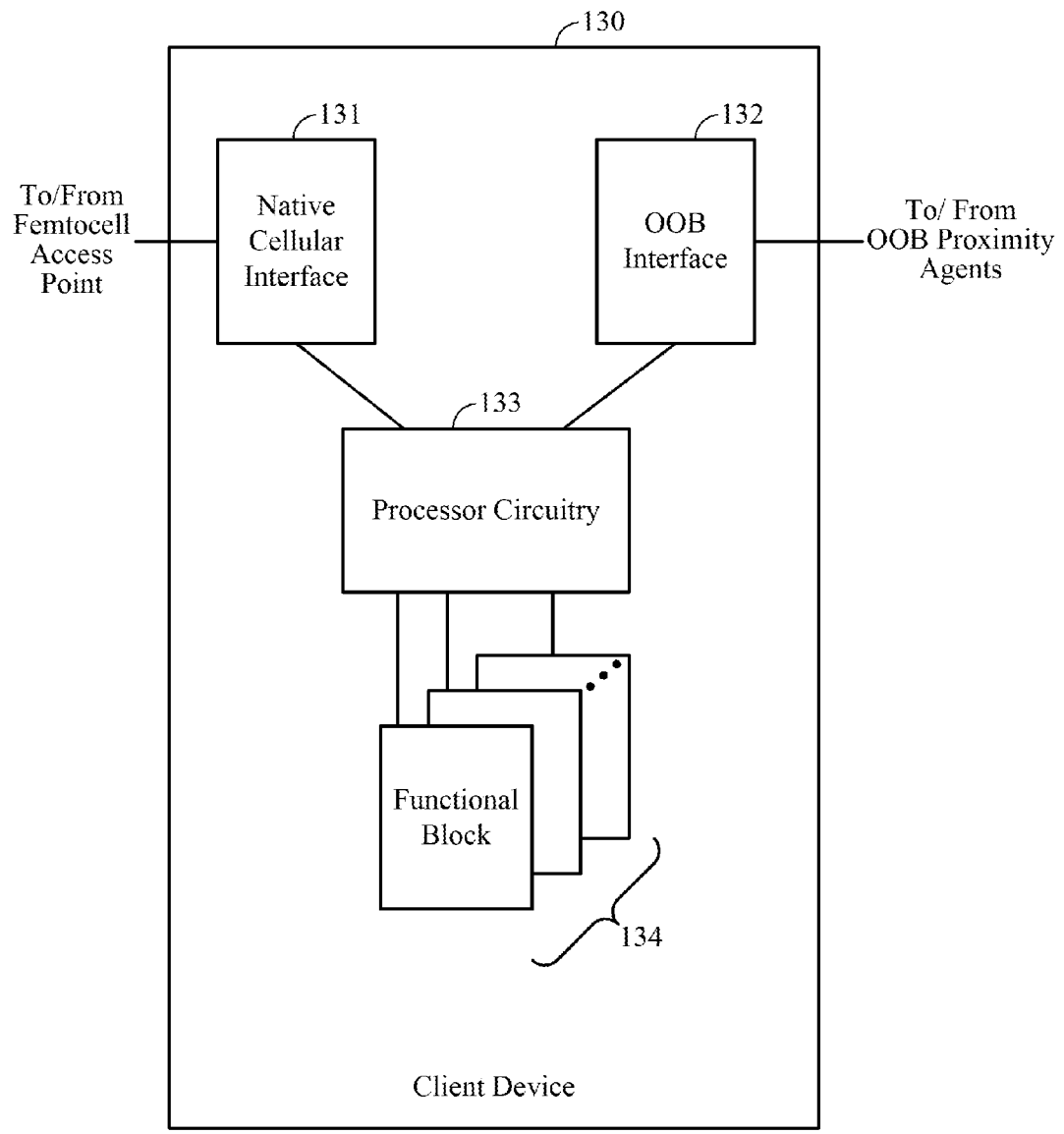
FIG. 1C shows detail with respect to a client device of the wireless communication system of FIG. 1A according to embodiments disclosed herein.

Directing attention to FIG. 1C, additional detail with respect to an embodiment of client device 130 is shown. Client device 130 may have various configurations of devices, such as personal computers (e.g., laptop computers, netbook computers, tablet computers, etc.), cellular telephones, PDAs, digital video recorders (DVRs), internet appliances, gaming consoles, e-readers, etc. Client device 130 of embodiments is provided in a mobile configuration, having an internal power supply (not shown), such as a small battery, to facilitate mobile operation.

Client device 130 of the illustrated embodiment includes native cellular interface 131 (e.g., a transceiver utilizing cellular network communication techniques that consume relatively large amounts of power in operation) for communicating with other appropriately configured devices (e.g., for establishing a link with communication network 150 via femtocell access point 110, both of FIG. 1A) through a native cellular wireless link. Native cellular interface 131 may operate according one or more communication standards, including but not limited to W-CDMA, CDMA2000, GSM, WiMax, and WLAN.

Furthermore, client device 130 of the illustrated embodiment also includes OOB interface 132 (e.g., a transceiver that may consume relatively low amounts of power in operation and/or may cause less interference in the in the in band spectrum) for communicating with other appropriately configured devices (e.g., OOB proximity agent 120 of FIG. 1A for providing interference mitigation and/or femtocell selection herein) through a wireless link. One example of a suitable communication interface, such as OOB interface 132, is a BLUETOOTH compliant transceiver that uses a time-division duplex (TDD) scheme.

In addition to native cellular interface 131 and OOB interface 132, client device 130 of the embodiment illustrated in FIG. 1C has one or more functional blocks 134, including circuitry and/or instruction sets, operable to provide desired functionality with respect to the client device (e.g., call processing, database management, multimedia playback, text messaging, multimode operation, etc.). Native cellular interface 131, OOB interface 132, and functional blocks 134 operate under control of processor circuitry 133, such as a general purpose processor operable under control of an instruction set (e.g., software, firmware, etc.) or special purpose processor (e.g., application specific integrated circuit (ASIC), programmable gate array (PGA), etc.), providing operation as described herein. Processor circuitry 133 can include circuitry in addition to the aforementioned processor, such as memory (e.g., random access memory (RAM), read only memory (ROM), flash memory, magnetic memory, optical memory, etc.), input/output circuits (e.g., display, keyboard, pointer, audio, etc.), and/or the like.

Figure 1D:
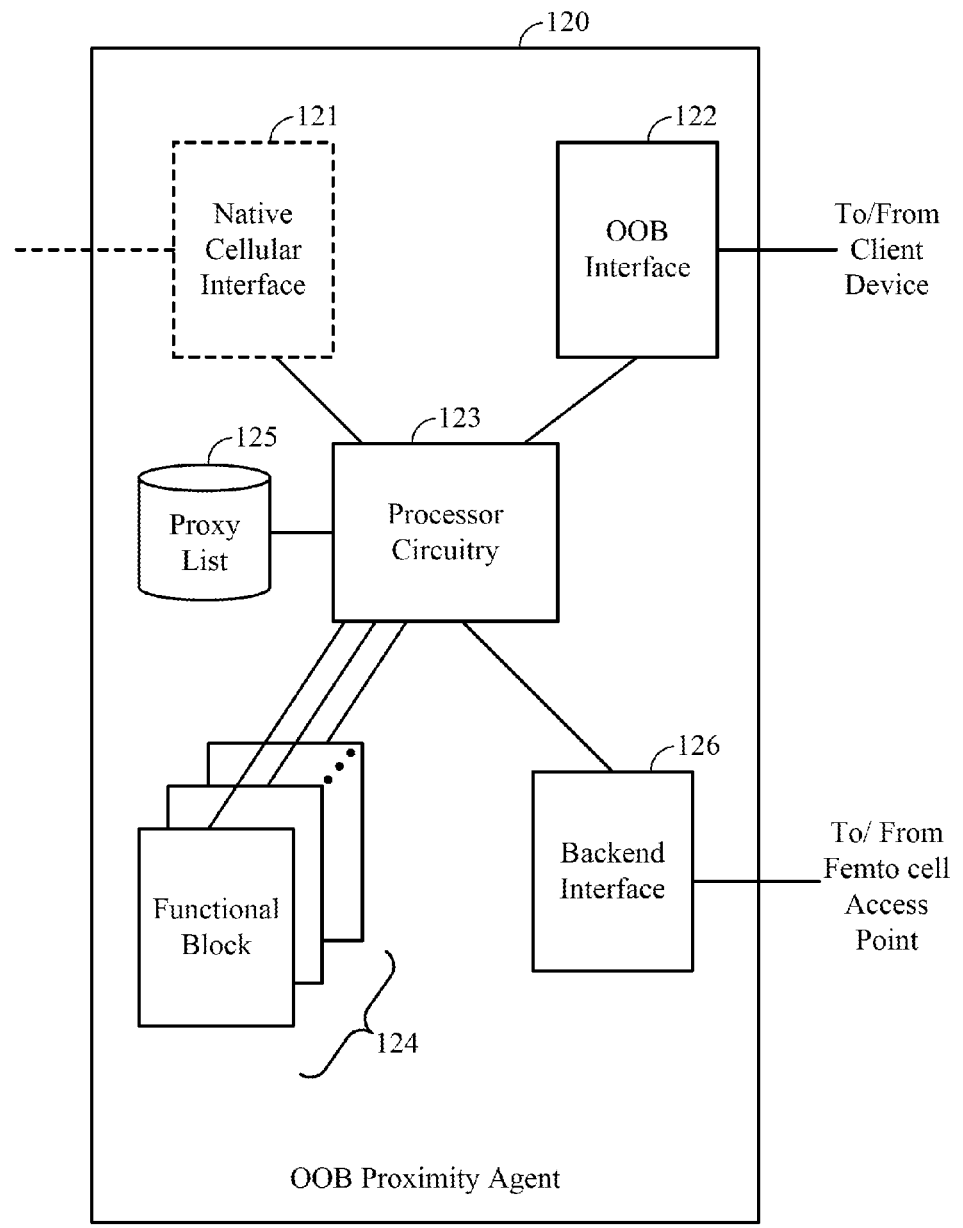
FIG. 1D shows detail with respect to an OOB proximity agent of the wireless communication system of FIG. 1A according to embodiments disclosed herein.

Referring now to FIG. 1D, additional detail with respect to an embodiment of OOB proximity agent 120 is shown. OOB proximity agent 120 may have various configurations of devices, such as a stand-alone processor based system, a processor based system integrated with a host device (e.g., access point, gateway, router, switch, repeater, hub, concentrator, etc.), etc. The embodiment of OOB proximity agent 120 illustrated in FIG. 1A, for example, is an implementation integrated with femtocell access point 110.

OOB proximity agent 120 of the illustrated embodiment includes OOB interface 122 (e.g., a transceiver that may consume relatively low amounts of power in operation and/or may cause less interference in the in the in band spectrum) for communicating with other appropriately configured devices (e.g., client device 130 of FIG. 1A for providing interference mitigation and/or femtocell selection herein) through a wireless link. One example of a suitable communication interface, such as OOB interface 122, is a BLUETOOTH compliant transceiver that uses a time-division duplex (TDD) scheme.

Furthermore, OOB proximity agent 120 of the illustrated embodiment also includes backend network interface 126 (e.g., packet switched network interface, switched network interface, radio network interface, control network interface, a wired link, and/or the like) for communicating with various devices of communication network 150 of FIG. 1A, such as femtocell access point 110 of FIG. 1A. Embodiments in which OOB proximity agent 120 is integrated within a host device, such as with femtocell access point 110 as illustrated in FIG. 1A, may utilize an internal bus or other such communication interface in the alternative to backend network interface 126 to provide communication between OOB proximity agent 120 and an associated femtocell access point, if desired. Additionally or alternatively, other interfaces, such as OOB interface 122, native cellular interface 121, etc., may be utilized to provide communication between OOB proximity agent 120 and an associated femtocell according to embodiments.

Native cellular interface 121 (e.g., a transceiver utilizing cellular network communication techniques that consume relatively large amounts of power in operation) is shown as an optional interface in the illustrated embodiment of OOB proximity agent 120. Such a native cellular interface may be utilized according to embodiments for communicating with various appropriately configured devices, such as femtocell access point 110 and/or client device 130 both of FIG. 1A, through a native cellular wireless link.

In addition to native cellular interface 121, OOB interface 122, and backend network interface 126, OOB proximity agent 120 of the embodiment illustrated in FIG. 1D has one or more functional blocks 124, such as circuitry and/or instruction sets, operable to provide desired functionality with respect to the OOB proximity agent (e.g., call processing, database management, proximity agent services, packet routing, gateway functionality, position location determination functionality (e.g., global positioning system (GPS) functionality), etc.). Native cellular interface 121, OOB interface 122, backend network interface 126, and functional blocks 124 operate under control of processor circuitry 123, such as a general purpose processor operable under control of an instruction set (e.g., software, firmware, etc.) or special purpose processor (e.g., ASIC, PGA, etc.), providing operation as described herein. Processor circuitry 123 can include circuitry in addition to the aforementioned processor, such as memory (e.g., random access memory (RAM), read only memory (ROM), flash memory, magnetic memory, optical memory, etc.), input/output circuits (e.g., display, keyboard, pointer, audio, etc.), and/or the like. OOB proximity agent 120 of embodiments further includes proximity agent list 125 to facilitate operation as described herein.

Client devices of embodiments, such as client device 130 of FIG. 1A, are mobile and may be moved into and out of various service areas provided by devices of communication network 150 of FIG. 1A. For example, client device 130 may move from a service area served by one node (e.g., a macrocell, microcell, picocell, femtocell, etc.) to a service area served by another node (e.g., a different macrocell, microcell, picocell, femtocell, etc.). Many cell discovery and selection schemes have been developed and implemented for facilitating such a mobile device associating with and/or handing off between such nodes. For example, typical scenarios provide for the client device searching for an available cell within range, negotiating links, etc. Such operation consumes an appreciable amount of power, often resulting in a reduction of the mobile client device standby time operation available from the internal power supply by approximately 10%.

Strategic deployment of network devices, such as femtocells, can mitigate mobile device power consumption to some extent. For example, femtocells may be utilized to provide service within areas which might not otherwise experience adequate or even any service (e.g., due to capacity limitations, bandwidth limitations, signal fading, signal shadowing, etc.), thereby allowing client devices to reduce searching times, to reduce transmit power, to reduce transmit times, etc. Femtocells provide service within a relatively small service area (e.g., within a house or building). Accordingly, a client device is typically disposed near a femtocell when being served, often allowing the client device to communicate with reduced transmission power. Nevertheless, an appreciable amount of power is utilized by a client device when discovering and selecting femtocells. Moreover, the use of such femtocells often causes interference with respect to other devices in the communication network due to femtocell transmission (i.e., there usually exists a trade off between interference and reliable detection of the femtocell).

Embodiments implement one or more OOB proximity agent, such as OOB proximity agent 120 of FIG. 1A, providing out of band communication with nodes, such as client device 130 of FIG. 1A, to provide assistance in or otherwise facilitate femtocell discovery, reselection, and/or interference mitigation. Out of band communication techniques utilized according to some embodiments herein provide for low power discovery, association, and communication as compared to corresponding femtocell or cellular network communication techniques.

In an out of band communication technique of embodiments, femtocell access point 110 of FIG. 1A provides communication links for use by client devices (e.g., client device 130 of FIG. 1A) in accordance with a cellular network for providing desired network communication sessions, while OOB proximity agent 120 of FIG. 1A provides communication links for use by the client devices which are out of band with respect to the cellular network for providing assistance in femtocell discovery, reselection and/or interference mitigation. In operation according to embodiments, if a client device searches for and finds OOB proximity agent 120, it will thus find femtocell access point 110.

Once OOB proximity agent 120 is discovered by client device 130, OOB proximity agent 120 may operate to cause femtocell access point 110 to increase transmit power for client device association, to "wake up" femtocell access point 110 for client device access, etc. Additionally or alternatively, OOB proximity agent 120 can provide assistance to client device 130 with respect to femtocell selection and association. For example, OOB proximity agent 120 may identify femtocell access point 110 to which the client device is to associate, or otherwise operate in a manner to facilitate association between femtocell access point 110 and client device 130. OOB proximity agent 120 may not operate to provide any direct assistance to client device 130 with respect to femtocell access point selection and association. The OOB proximity agent 120 directly or indirectly facilitates an association between femtocell access point 110 and client device 130.

Figure 2A:
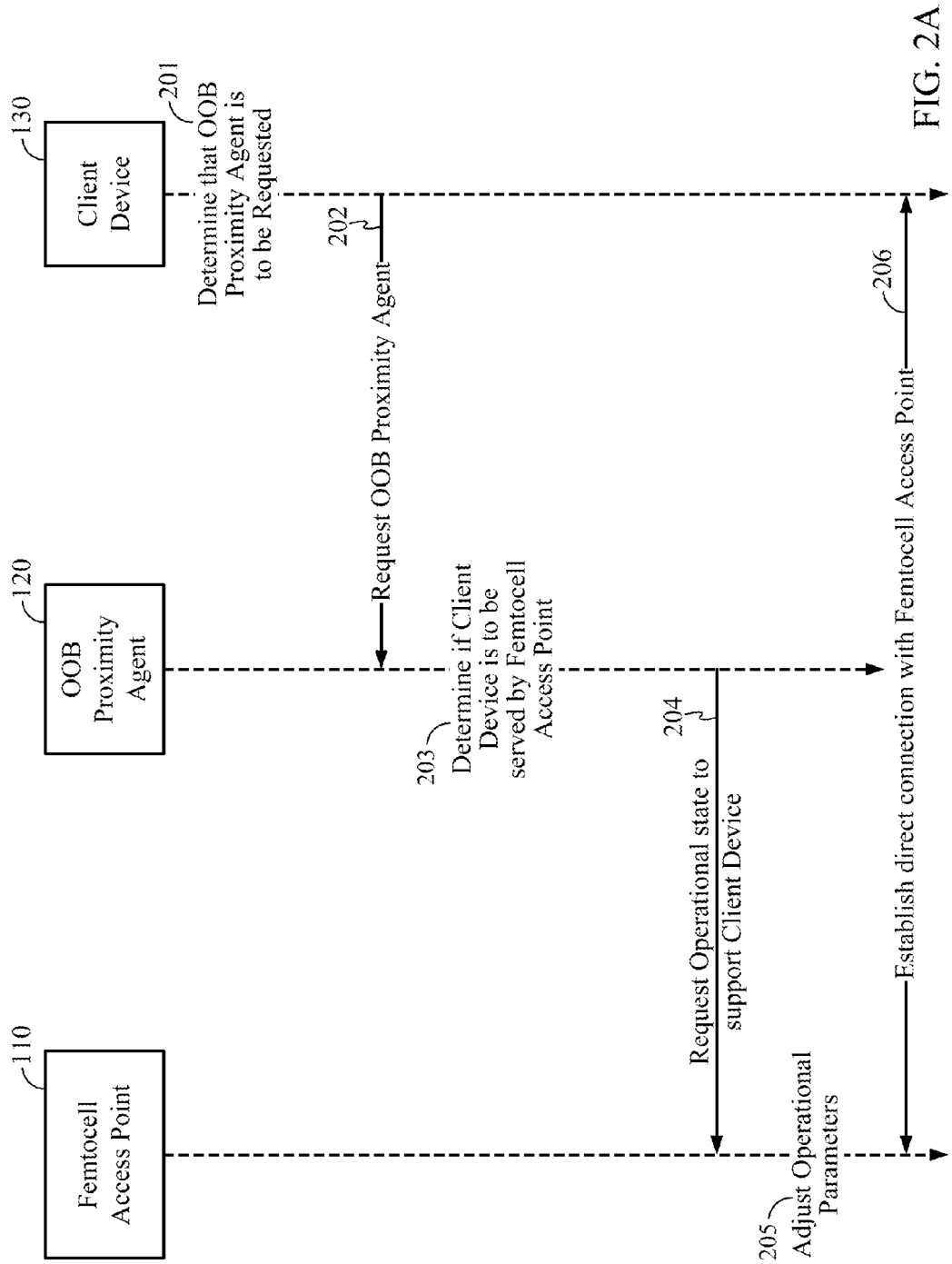
FIG. 2A shows a flow diagram of an exemplary operational flow providing out of band communication to assist in or otherwise facilitate femtocell discovery, reselection, and/or interference mitigation according to embodiments disclosed herein.

Directing attention to FIG. 2A, a flow diagram showing an exemplary operational flow providing out of band communication to assist in or otherwise facilitate femtocell discovery, reselection, and/or interference mitigation is shown. In operation according to the illustrated embodiment, client device 130 determines that services of an OOB proximity agent are to be requested at point 201. A determination that services of an OOB proximity agent are to be requested may be made in a number of ways according to embodiments herein. For example, client device 130 may determine that a trigger condition exists for requesting the services of an OOB proximity agent. Additionally or alternatively, client device 130 may actively scan for (e.g., using OOB interface 132 of FIG. 1C) an OOB proximity agent in proximity to client device 130. For example, an OOB proximity agent may proactively operate to page client devices (e.g., transmitting a paging signal periodically). Thus, when a client device is within range of such an OOB proximity agent the client device may send a paging response whereby the client device and a femtocell detect each other over the OOB link. Determinations to scan for an OOB proximity agent may be made, for example, when a current serving node (e.g., macrocell) is providing adequate communication service and the client device is searching for a femtocell as it is a preferred system. However, when a current serving node is not providing adequate communication service (e.g., signal strength is weak), traditional techniques for intra-frequency and inter-frequency scans may be utilized to search for a suitable node to provide service.

Trigger conditions which may cause a client device to activate an out of band interface (e.g., BLUETOOTH radio) to send an OOB proximity agent inquiry or page according to embodiments include various measurements, determinations, etc., such as a macro pilot Ec/Io average threshold (e.g., −8 dB, −12 dB), the client device being located in a preferred user zone (e.g., by analyzing location signatures), the client device location is not changing for a period of time, etc. In establishing one or more trigger condition, a client device may collect location signatures (e.g., IDs of macrocells in view, signal strengths, etc.) while in association with an OOB proximity agent and/or femtocell. Additionally or alternatively, the femtocell network listen (NL) may perform network environment measurements, whereby a network planning task may be run to predict the signatures within the service are of a femtocell and/or OOB proximity agent.

The foregoing signatures may be provided in a record, such as in a predetermined format (e.g., PN offset, Cell ID, NID, SID, Ec/Io, etc.), for later use in determining that the client device is in a location that an OOB proximity agent is to be requested. For example, a client device may store the signatures in a memory thereof, perhaps marking or otherwise designating such signatures as proximity agent resource location (PARL) signatures. Of course, PARL signatures may utilize parameters in addition to or in the alternative to the foregoing exemplary parameters, such as PSC, RSCP, etc. Multiple such PARL signatures may be stored, such as to facilitate OOB proximity agent operation at multiple locations (home, office, frequently visited location, etc.).

Whenever a client device is in or near a location potentially represented by a PARL signature (e.g., the client device is camped on any of the corresponding macrocells), the client device may operate to compare a currently measured signature with the stored PARL signatures and trigger the OOB search process when a match is found (e.g., a match may mean that any of the macrocell pilots are with ±x of its PARL signature value, for example). If, however, a signature or trigger condition is met but an OOB proximity agent is not discovered within a few attempts, operation of a client device of embodiments will fall back on traditional or other resource selection techniques (e.g., traditional femtocell discovery approaches).

Techniques in addition to or in the alternative to the use of the foregoing signatures may be utilized to trigger an OOB proximity agent request. For example, embodiments may implement trigger conditions such as a client device being disposed in a preferred user zone, the client device location not having changed for a predetermined period of time, etc.

It should be appreciated that operation to request OOB proximity agent services according to embodiments results in minimal impact on power consumption by a client device adapted to operate with an OOB proximity agent (e.g., minimal impact upon client device standby time) through use of trigger conditions to avoid unnecessary background searches. That is, OOB proximity agent paging using OOB interfaces according to embodiments herein in presence of trigger conditions as discussed above consumes less power than more traditional femtocell searches. Moreover, a client device adapted to operate with an OOB proximity agent herein may operate to perform a background search for a femtocell only when in proximity of the femtocell (e.g., detects an OOB proximity agent), thereby providing power savings. It should be appreciated that the foregoing advantages are provided without causing interference to client devices operating in association with a macrocell of the network.

Proceeding with the flow diagram of FIG. 2A, having determined that services of an OOB proximity agent are to be requested at point 201, client device 130 issues a request for OOB proximity agent services at point 202. In operation according to embodiments, client device 130 utilizes OOB interface 132 of FIG. 1C to communicate a page for an OOB proximity agent serving the current location of client device 130. Additionally or alternatively, client device 130 may issue a request directed to a particular OOB proximity agent (e.g., OOB proximity agent 120), based upon present location information, information regarding the location of particular OOB proxies, etc. (e.g., using the aforementioned signatures and information regarding corresponding OOB proxies). An out of band link may thus be established between client device 130 and OOB proximity agent 120 using OOB interfaces 132 and 122 of FIGS. 1C and 1D, respectively. A request for OOB proximity agent services may be communicated via this out of band link.

OOB proximity agent 120 of the illustrated embodiment operates to determine if client device 130 is to be served by femtocell access point 110 associated with OOB proximity agent 120 at point 203. For example, femtocell access point 110 may provide services only to particular, registered client devices. Additionally or alternatively, femtocell access point 110 may be able to accommodate a limited number, type, configuration, etc. of client devices, of which client device 130 may or may not be included. Accordingly, OOB proximity agent 120 of embodiments operates to determine if client device 130 is to be served by femtocell access point 110 prior to providing any instructions thereto to alter a state of femtocell access point 110. For example, OOB proximity agent 120 may utilize information such as electronic serial number (ESN), mobile identification number (MIN), international mobile subscriber identity (IMSI), temporary mobile subscriber identity (TMSI), internet protocol (IP) address, media access control (MAC) address, telephone number, and/or the like (e.g., provided by client device 130 in the request for OOB proximity agent services) to compare with femtocell service information (e.g., stored in proximity agent list 125 of OOB proximity agent 120 of FIG. 1D). Additionally or alternatively, OOB proximity agent 120 may utilize information provided from/to femtocell access point 110 for determining if client device 130 is to be served by femtocell access point 110 (e.g., femtocell load information, client device authorization information, etc.).

Having determined that client device 130 is to be served by femtocell access point 110 at point 203, OOB proximity agent 120 of the illustrated embodiment issues a request for femtocell access point 110 to establish an operational state to support client device 130 at point 204. In operation according to embodiments, OOB proximity agent 120 utilizes backend network interface 126 of FIG. 1D to communicate the request to femtocell access point 110. As discussed further below, femtocell access point 110 may reduce the transmit power or disable the radio of native cellular interface 111 of FIG. 1B to mitigate interference, possibly inhibiting the ability of OOB proximity agent 120 to establish communication with femtocell access point 110 using the native cellular interface. Accordingly, embodiments operate to utilize an interface other than the native cellular interface when communicating a request for operation state to support a client device by the OOB proximity agent. Although an embodiment has been described above with reference to use of the network interface for communicating the aforementioned request between the OOB proximity agent and femtocell, embodiments may utilize a different interface, such as OOB interfaces 122 and 116 of FIGS. 1D and 1B, an internal communication bus (e.g., for integrated or co-located embodiments of the OOB proximity agent and femtocell access point), etc.

Figure 3A:
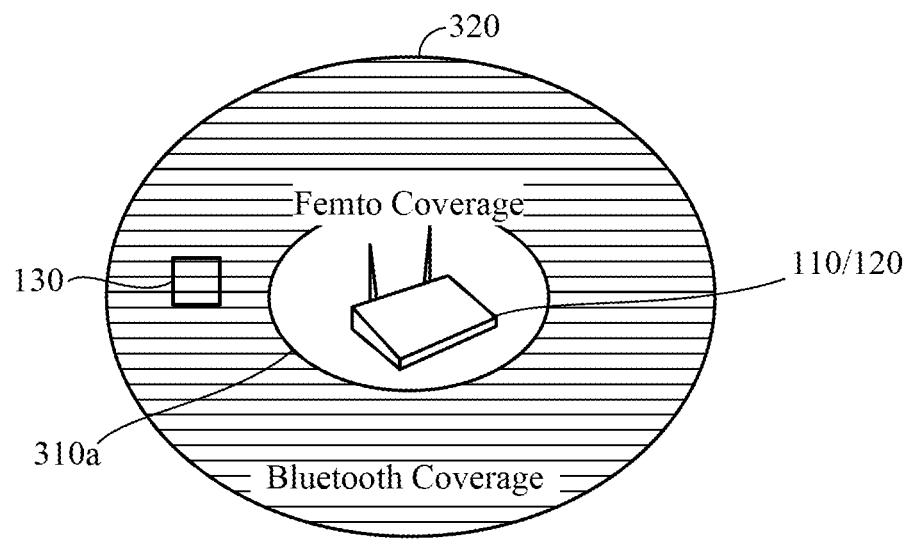
FIG. 3A shows reduced power state operation of a femtocell access point of embodiments.
Figure 3B:
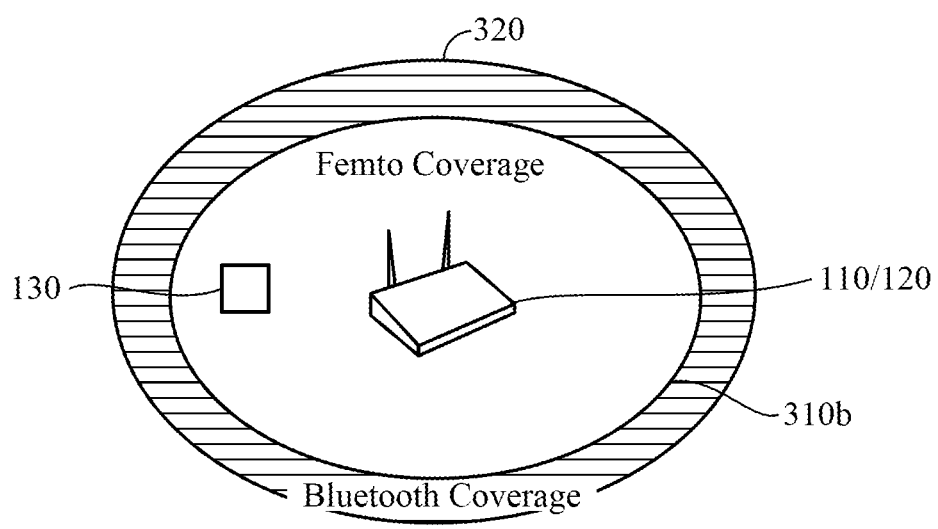
FIG. 3B shows restored power state operation of a femtocell access point of embodiments.

Femtocell access point 110 of the illustrated embodiment operates to adjust one or more attributes (i.e., operational parameters) to facilitate serving client device 130, in response to the request from OOB proximity agent 120, at point 205. For example, femtocell access point 110 may operate to reduce the femtocell transmit power level (e.g., main pilot transmit level) or disable a femtocell radio transmitter (e.g., main pilot transmitter) when there is no authorized client device attached to femtocell access point 110 and associated OOB proximity agent 120. Such a reduced power state (also referred to as a "wilted" state, whereby femtocell access point "wilting" leads to such a wilted state) is illustrated in FIG. 3A, wherein the wireless coverage provided by femtocell access point 110 is reduced, as shown by area 310a. It should be appreciated, however, that the wireless coverage 320 provided by OOB proximity agent 120 remains substantially coextensive with a desired service area of the femtocell, as shown by area 320. Upon receiving a proper request or other indication for an operational state to support a client device (e.g., the request from OOB proximity agent 120 at point 205), femtocell access point 110 of embodiments operates to increase the femtocell transmit power level or enable a femtocell radio transmitter for providing communication services. Such a restored power state (also referred to as a "bloomed" state, whereby femtocell access point "blooming" leads to such a bloomed state) is illustrated in FIG. 3B, in which the wireless coverage 320 provided by femtocell access point 110 is coextensive with a desired service area of the femtocell, as shown by area 310b.

It should be appreciated that the state from which femtocell access point 110 changes to support client device 130 may itself support operation of client devices, and thus may be a state other than a severely reduced transmit power level or disabled radio transmitter. For example, the state of femtocell access point 110 prior to altering states to support client device 130 may be a reduced transmit power level state established to support communication with respect to a client device (not shown) closer to femtocell access point 110 than client device 130.

Femtocell access point 110 of embodiments may operate to perform functionality in addition to or in the alternative to the aforementioned operational state change in response to the request provided by OOB proximity agent 120. For example, femtocell access point 110 may perform validation of client device 130 (in addition to or in the alternative to the validation of client device 130 provided by OOB proximity agent 120), such as ensure the client device 130 is an authorized femtocell client device (e.g., mapping of authorized client device identities for the femtocell and their BD_ADDR may be maintained by femtocell access point 110 and/or OOB proximity agent 120).

OOB proximity agent 120 of embodiments may operate to provide information (not shown) for connecting femtocell access point 110 to client device 130 (e.g., after point 203 and prior to point 206 of the flow showing in FIG. 2A). For example, OOB proximity agent 120 may provide client device 130 with information regarding attributes, such as the particular channels (e.g., frequency, time, code, etc.) for establishing communication with femtocell access point 110. Alternatively, embodiments may simply provide information indicating that a femtocell access point is within range of client device 130 and thus client device 130 should employ autonomous operation to search for an available femtocell. However, OOB proximity agent 120 of embodiments of the disclosure may not provide any information to client device 130 for connecting to femtocell access point 110 (e.g., detection of an OOB proximity agent may be relied upon as an indication that a femtocell access point is within range of the client device).

Having adjusted one or more operational parameters to support communication with client device 130, a connection between femtocell access point 110 and client device 130 is established at point 207. In operation according to embodiments, client device 130 utilizes native cellular interface 131 shown in FIG. 1C to communicate with femtocell access point 110 through corresponding native cellular interface 111 shown in FIG. 1B. Accordingly, a communication link for supporting desired communication with devices of communication network 150 of FIG. 1A is established according to the illustrated embodiment.

In operation according to the foregoing, client devices associate with OOB proxies when the client devices are in femto-proximity agent coverage range (e.g., within area 320 of FIGS. 3A and 3B) and a trigger condition is met. After the client device and OOB proximity agent are associated over an out of band link, an operating parameter of a femtocell associated with the OOB proximity agent may be adjusted (e.g., the femtocell transmit power increased or enabled) to facilitate communication between the client device and femtocell. It should be appreciated that such operation mitigates interference with neighboring macrocells and femtocells, particularly those on the same frequency as the femtocell.

Operation of OOB proxies of embodiments does not end with operation to aid femtocell selection, such as set forth in the flow diagram of FIG. 2A. For example, OOB proximity agent 120 may continue to provide services with respect to client device 130 and/or femtocell access point 110 after a communication link has been established there between.

Figure 2B:
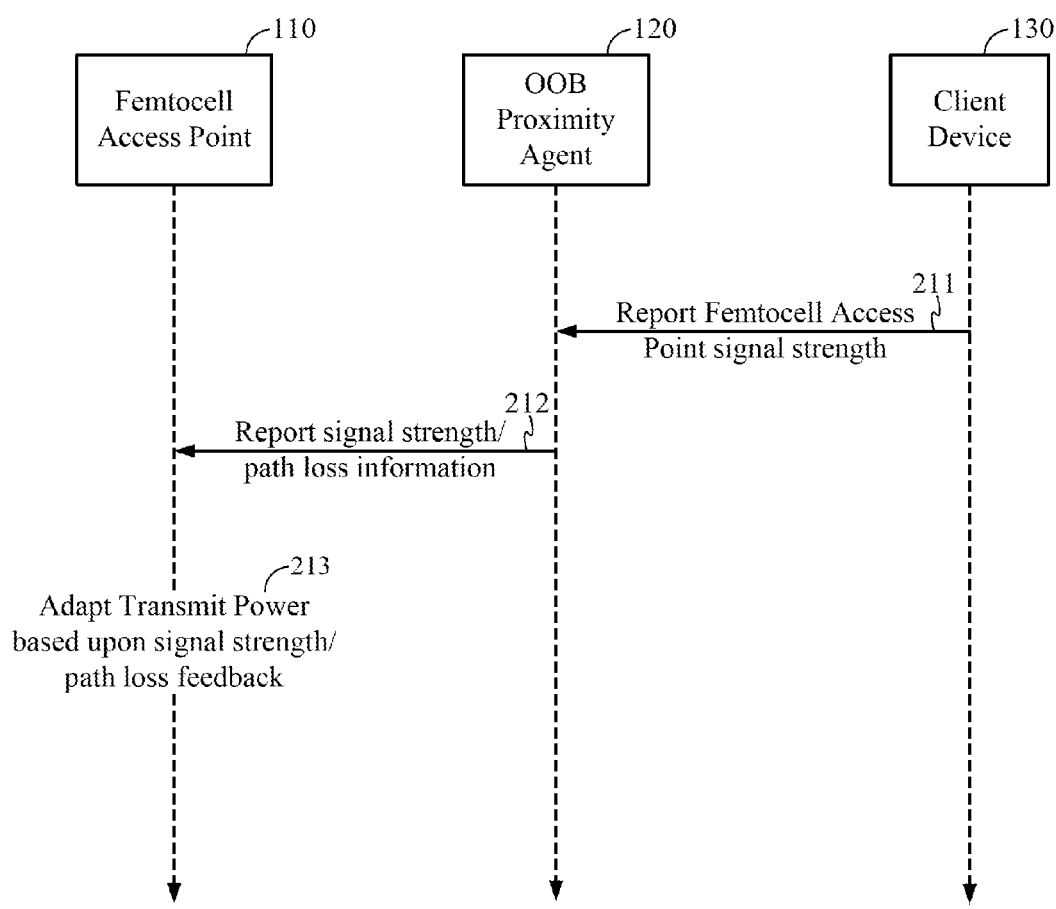
FIG. 2B shows a flow diagram showing an exemplary operational flow providing interference mitigation using an out of band link according to embodiments disclosed herein.

Directing attention to FIG. 2B, a flow diagram showing an exemplary operational flow providing interference mitigation using an out of band link is shown. As previously mentioned, femtocell access point 110 and OOB proximity agent 120 may be co-located, and thus the communications between the femtocell access point and OOB proximity agent represented in FIG. 2B may comprise communications over an internal communication bus, inter process communication, etc. Upon entering the flow of FIG. 2B, client device 130 is assumed to be in communication with femtocell access point 110 (e.g., in operation as concluded in the flow diagram of FIG. 2A).

Client device 130 of the illustrated embodiment (as well as other client devices being provided femto-proximity agent services) periodically reports the signal strength (e.g., pilot Ec/No, RSSI, etc.) of signals received from femtocell access point 110 to OOB proximity agent 120 at point 211. Additionally or alternatively, OOB proximity agent 120 may query client devices for such femtocell access point signal strength information. The out of band link provided by OOB interfaces 122 and 132 of FIGS. 1D and 1C may be utilized for communicating such information between client device 130 and OOB proximity agent 120.

OOB proximity agent 120 of the illustrated embodiment reports the signal strength/path loss information to femtocell access point 110 at point 212. In operation according to embodiments, OOB proximity agent 120 utilizes backend network interface 126 of FIG. 1D to communicate the signal strength/path loss information to femtocell access point 110. Additionally or alternatively, embodiments may operate to utilize an interface other than the network interface, such as OOB interfaces 122 and 116 of FIGS. 1D and 1B, an internal communication bus (e.g., for integrated embodiments of the OOB proximity agent and femtocell access point), etc.

Figure 5:
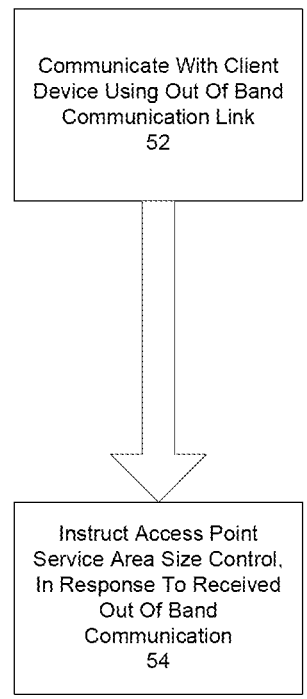
FIG. 5 is a flow diagram showing an exemplary process, according to one aspect of the present disclosure.

Referring to FIG. 5, an exemplary flow will now be described. At block 52, communication with a client device occurs using out of band signaling. At block 54 a femtocell access point is instructed to control its service area, in response to out of band communication received from the client device.

Femtocell access point 110 of the illustrated embodiment operates to mitigate interference caused by femtocell access point 110 to neighboring macrocells and femtocells by adapting transmit power based on the signal strength/path loss feedback provided by OOB proximity agent 120 at point 213. For example, femtocell access point 110 may operate to adjust transmit power level (i.e., decrease a size of a service area of the access point) just to a point that adequately serves client devices. That is, femtocell transmit power (e.g., for pilot and overhead messages) may be adapted so that the client device experiencing the worst signal strength can remain camped on the femtocell (preferably with some margin so as to prevent femto-macro reselections and "ping pongs"). Femtocell transmit power adaptation may be done only when the required transmit power (e.g., with margin) is less than nominal transmit power. The foregoing operation of OOB proximity agent 120 of embodiments assists in femtocell transmit power self calibration and reduces interference with neighboring macrocells and femtocells.

Additional or alternative operation may be provided according to embodiments to facilitate mitigation of interference. For example, client devices (e.g., frequent users and occasional users of a femtocell) of embodiments may have profiles which are registered with one or more OOB proximity agent. In operation according to an embodiment, if all registered client devices are attached to an OOB proximity agent, the OOB proximity agent may notify an associated femtocell which can modify its operation accordingly. For example, having all client devices served by the femtocell already attached, the femtocell may lower its transmit power to that needed to adequately serve the attached client devices, stop transmitting beacons in macrocell frequencies, and/or the like. Additionally or alternatively, an OOB proximity agent may provide information to facilitate a femtocell disabling its radio transmitter or to reduce the power level when there are no client devices detected by the OOB proximity agent (e.g., no client devices discovered by the OOB proximity agent irrespective of whether they are in proximity agent mode or not). Accordingly, as client devices discover the OOB proximity agent when in femto-proximity agent coverage range the OOB proximity agent may provide information to the femtocell so the femtocell radio transmitter is enabled or the power level is increased (i.e., increasing a size of a service area of the access point) to facilitate communication between the client device and femtocell. Likewise, an OOB proximity agent of embodiments can aid in femtocell transmit power self calibration.

It should be appreciated that embodiments of the disclosure are particularly suited for deployment in existing networks. For example, embodiments described herein may be deployed with no client device provisioning and no radio access network (RAN) configuration. Moreover, in operation according to embodiments, if an OOB proximity agent is not discovered, the client device may fall back on preexisting femtocell discovery and selection techniques, if desired. For example, normal search thresholds (e.g., Sintersearch threshold) may be retained such that when macrocell signal strength drops below such a threshold (e.g., CPICH Ec/Io<Sintersearch) the client device will search for cells to reselect even if an out-of-band interface of the client device does not detect an OOB proximity agent. Accordingly, embodiments aid rather than replace femtocell selection techniques.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may be a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, certain aspects may be a computer program product for performing the operations presented herein. For example, such a computer program product may be a computer readable medium having instructions tangibly stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

Although the present teachings and their advantages have been described in detail, it should be understood that various changes, substitutions and alterations can be made herein without departing from the technology of the teachings as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present teachings. Accordingly, the appended claims are intended to include within their scope such processes, machines, manufacture, compositions of matter, means, methods, or steps.

What is claimed is:

1. A method to facilitate client device and access point association, the method comprising:
    communicating with at least one client device using a communication link which is out of band (OOB) with respect to cellular communication links of a cellular network; and
    instructing the access point, operable to communicate with the at least one client device using the cellular communication links, to control a size of a cellular service area of the access point to establish a communication session between the access point and the at least one client device using a link of the cellular communication links in response to receiving communication from the at least one client device over the OOB communication link.

2. The method of claim 1, wherein the cellular network includes a global system for mobile telecommunication (GSM) cellular network, a wideband code division multiple access (W-CDMA) network, and/or a CDMA2000 network, and wherein the OOB communication link comprises a link of a network including a BLUETOOTH network, a ultrawideband (UWB) network, an Institute of Electrical and Electronics Engineers (IEEE) 802.11 network, and/or an Internet protocol (IP) network.

3. The method of claim 1, wherein the OOB communication link comprises a virtual OOB link using an Internet protocol (IP) based mechanism over a wireless wide area network (WWAN) link.

4. The method of claim 1, further comprising:
    providing information regarding the access point to the at least one client device to facilitate establishing the communication session between the access point and the at least one client device.

5. The method of claim 1, wherein controlling the size of the cellular service area of the access point comprises:
    controlling the access point to increase transmission power with respect to the cellular communication links after receiving the communication from the at least one client device using the OOB communication link.

6. The method of claim 5, further comprising:
    instructing control of the access point to reduce transmission power with respect to the cellular communication links prior to receiving the communication from the at least one client device using the OOB communication link.

7. The method of claim 1, wherein the access point comprises a femtocell access point.

8. The method of claim 1, wherein the controlling the size of the cellular service area of the access point is performed to provide interference mitigation with respect to the cellular network.

9. The method of claim 1, wherein the controlling the size of the cellular service area of the access point in response to the at least one client device communicating using the OOB communication link is performed to provide power savings with respect to the at least one client device.

10. The method of claim 1, further comprising:
storing at least one location signature comprising information regarding a client device signal environment; and
determining the at least one client device is located where communications via the OOB communication link occurs, through reference to a location signature of the at least one location signature.

11. The method of claim 1, further comprising:
transmitting a paging signal which is out of band with respect to the cellular network.

12. The method of claim 11, further comprising scanning for the paging signal when a node of the cellular network currently serving the client device is providing adequate communication service.

13. A proximity agent comprising:
a first communication interface adapted to communicate with a client device using a communication link which is out of band with respect to communication links of a cellular network;
a second communication interface adapted to communicate with an access point that provides the client device wireless communication with the cellular network; and
a controller adapted to provide control signals to the access point through the second communication interface operable to control a size of a cellular service area of the access point to establish a communication session with the cellular network between the client device and the access point using a link of the cellular communication links, controller operating in response to receiving communication from the client device over the OOB communication link.

14. The proximity agent of claim 13, wherein the proximity agent is co-located with the access point.

15. The proximity agent of claim 13, wherein the proximity agent is separate from the access point, and wherein the second communication interface provides communication between the proximity agent and the access point which is out of band with respect to the communications of the cellular network.

16. The proximity agent of claim 13, wherein the first communication interface comprises an interface including a BLUETOOTH interface, an ultra-wideband (UWB) interface, an Institute of Electrical and Electronics Engineers (IEEE) 802.11 interface, an Internet protocol (IP) interface, and/or a ZIGBEE interface.

17. The proximity agent of claim 13, wherein the first communication interface comprises a virtual OOB link using an Internet protocol (IP) based mechanism over a wireless wide area network (WWAN) link.

18. The proximity agent of claim 13, wherein the logic of the proximity agent is adapted to provide control signals to the access point to control the size of the cellular service area of the access point by increasing transmission power with respect to cellular network wireless communication links after the particular client device communicates with the proximity agent using the first communication interface.

19. The proximity agent of claim 18, wherein the logic of the proximity agent is further adapted to provide control signals to the access point to control the access point to reduce transmission power with respect to the cellular network wireless communication links prior to the particular client device communicating with the proximity agent using the first communication interface.

20. A computer program product operable to facilitate client device and access point association using a proximity agent, the program product comprising:
a non-transitory computer readable medium storing computer executable code, including:
code to establish communication between a proximity agent and at least one client device using a communication link that is out of band with respect to communication links of a cellular network; and
code to control a size of a cellular service area of an access point to establish a communication session between the access point and the at least one client device using a link of the cellular communication links of the cellular network in response to the at least one client device communicating with the proximity agent using the out of band communication link.

21. The computer program product of claim 20, wherein the out of band communication link comprises a low power communication link as compared to the in band communication link.

22. The computer program product of claim 20, further comprising:
code to provide information regarding the access point to the at least one client device by the proximity agent to facilitate establishing the communication session between the access point and the at least one client device.

23. The computer program product of claim 20, wherein the code to control the size of the cellular service area of the access point in response to the at least one client device communicating with the proximity agent comprises:
code to control the access point to increase transmission power with respect to an in band signal to establish the in band communication link after the at least one client device communicates with the proximity agent using the out of band communication link.

24. The computer program product of claim 23, further comprising:
code to control the access point to reduce transmission power with respect to the in band signal prior to the at least one client device communicating with the proximity agent using the out of band communication link.

25. A system to facilitate client device and access point association, the system comprising:
means for communicating with client devices in accordance with a cellular network using cellular communication links;
means for communicating with at least one client device of the client devices using a communication link which is out of band with respect to the cellular communication links of the cellular network; and
means for controlling an attribute of transmission of a signal of the cellular communication links to establish a cellular network communication session with the at least one client device using a link of the cellular communication links in response to receiving communication from the at least one client device via the communication link that is out of band with respect to the cellular network.

26. The system of claim 25, wherein the means for controlling the attribute of transmission of the signal of the cellular communication links comprises:
means for controlling the access point to increase transmission power with respect to the cellular communication links after receiving communication from the at least one client device via the communication link that is out of band with respect to the cellular network.

27. The system of claim 26, further comprising:
means for controlling the access point to reduce transmission power with respect to the cellular communication links prior to receiving communication from the at least one client device via the communication link that is out of band with respect to the cellular network.

28. The system of claim 25, further comprising:
means for storing at least one location signature comprising information regarding a client device signal environment; and
means for determining the at least one client device is located where communications via the communication link that is out of band with respect to the cellular network occurs, through reference to a location signature of the at least one location signature.

* * * * *